United States Patent [19]

Olander

[11] 4,223,757
[45] Sep. 23, 1980

[54] FORWARD AND REVERSE POWER CONTROL APPARATUS

[75] Inventor: Harvey F. Olander, Corpus Christi, Tex.

[73] Assignee: Gustafson Mfg. Co., Corpus Christi, Tex.

[21] Appl. No.: 921,099

[22] Filed: Jun. 30, 1978

[51] Int. Cl.² .............................................. B60K 23/00
[52] U.S. Cl. ..................................... 180/273; 74/213; 474/113
[58] Field of Search ............... 180/100, 101, 102, 271, 180/272, 273; 74/242.12, 242.15 R, 242.11 C, 209, 207, 213

[56] References Cited

U.S. PATENT DOCUMENTS

| | | | |
|---|---|---|---|
| 1,460,070 | 6/1923 | Maimin | 74/207 |
| 2,457,821 | 1/1949 | Johnson | 74/207 X |
| 2,912,871 | 11/1959 | Velkoff | 74/242.15 R X |
| 3,229,452 | 1/1966 | Hasenbank | 180/101 X |
| 3,700,062 | 10/1972 | Garnett | 180/101 |

Primary Examiner—John J. Love
Assistant Examiner—Michael Mar
Attorney, Agent, or Firm—Stevens, Davis, Miller & Mosher

[57] ABSTRACT

A pulley on an output shaft of an engine is coupled via a belt to a drive pulley which is mechanically coupled to the drive wheels of a vehicle. The tension of the belt is controllable by forward movement of a control lever from a neutral position; the control lever being arranged to shift the drive pulley relative to the output shaft pulley. The controlled variations in the tension of the belt caused by movement of the control lever produces a controlled degree of mechanical coupling between the output shaft pulley and the drive pulley to control the forward speed of the vehicle. A friction surface, provided on a circumferential periphery of the drive pulley, is capable, upon reverse movement of the control lever from the neutral position, of directly engaging with the output shaft pulley to cause reverse movement of the vehicle. A pair of belt relief straps are provided for cooperating with the belt when the control lever is in the reverse operation mode to ensure disengagement of the belt coupling between the output shaft pulley and the drive pulley. A safety device for placing and keeping the drive pulley in a neutral position when an operator disembarks from the vehicle is also provided.

19 Claims, 5 Drawing Figures

FORWARD AND REVERSE POWER CONTROL APPARATUS

BACKGROUND OF THE INVENTION

The present invention relates to a drive control apparatus for a motor driven vehicle particularly a small tractor, golf cart, or other small engine propelled vehicle. The present invention is particularly useful for a power propelled vehicle carrying power driven means for cutting the grass of an athletic field or the like in a narrow strip while simultaneously applying marking material to the strip to provide boundary lines and other lines thereon. Such a vehicle is described in detail in U.S. Pat. No. 3,052,077.

Although the line marking machine described in the aforesaid patent works fine in cutting a long line, it is limited in its ability to cut and mark short line segments because the power control apparatus which couples the engine to the drive wheels cannot be controlled to provide precision starts and stops for the vehicle while allowing the engine to run at full speed to power the grass cutter at its most efficient cutting speed. Also, the line marking machine is not adapted for reverse movement.

Accordingly, an object of the invention is to provide a power control mechanism which allows a variable forward speed and reverse control of a motor driven in which the motor must run at a high constant output speed, such as in the line marking vehicle described in the above-mentioned patent.

The drive control apparatus according to the present invention provides an operator with both precision starts and stops of the vehicle while allowing the engine to run at a predetermined full speed to power, in the case of the above-mentioned line marking apparatus, the grass cutter at its most efficient speed. Thus, when the drive control apparatus of the present invention is used with the line marker, an operator may creep up to and stop at the beginning of a line to be marked, begin cutting and/or marking at a precise point while moving forward at the full rate of speed of the engine of the vehicle, travel to the opposite end of the line, slow down and stop. Thereafter, the cutter may be raised and the vehicle move forward to the next line. If the operator overshoots a line, the reverse control mechanism allows him to back-up before engaging the cutter.

Since it is possible that an absentminded operator may engage the control apparatus of the vehicle while disembarking from the same, the present invention also provides a unique seat disengagement apparatus which prevents vehicle run away by forcing the power control apparatus to remain in its neutral or rest running position unless the seat of the vehicle is occupied.

These and other objects of the present invention will become apparent from the following detailed description of the invention when read in conjunction with the accompanying drawings.

The description of the power control apparatus of the present invention which follows is made with particular reference to the line marking vehicle illustrated in U.S. Pat. No. 3,052,077, and to the extent the details of the vehicle per se are deemed relevant, that patent is incorporated herein by reference. However, it should be understood from the foregoing that the invention has utility in other small motor driven vehicles as well.

FIGS. 1 thru 5 illustrate the line marking machine described in the aforesaid U.S. patent, as modified to include the power control apparatus of the present invention thereon.

Figure 1:
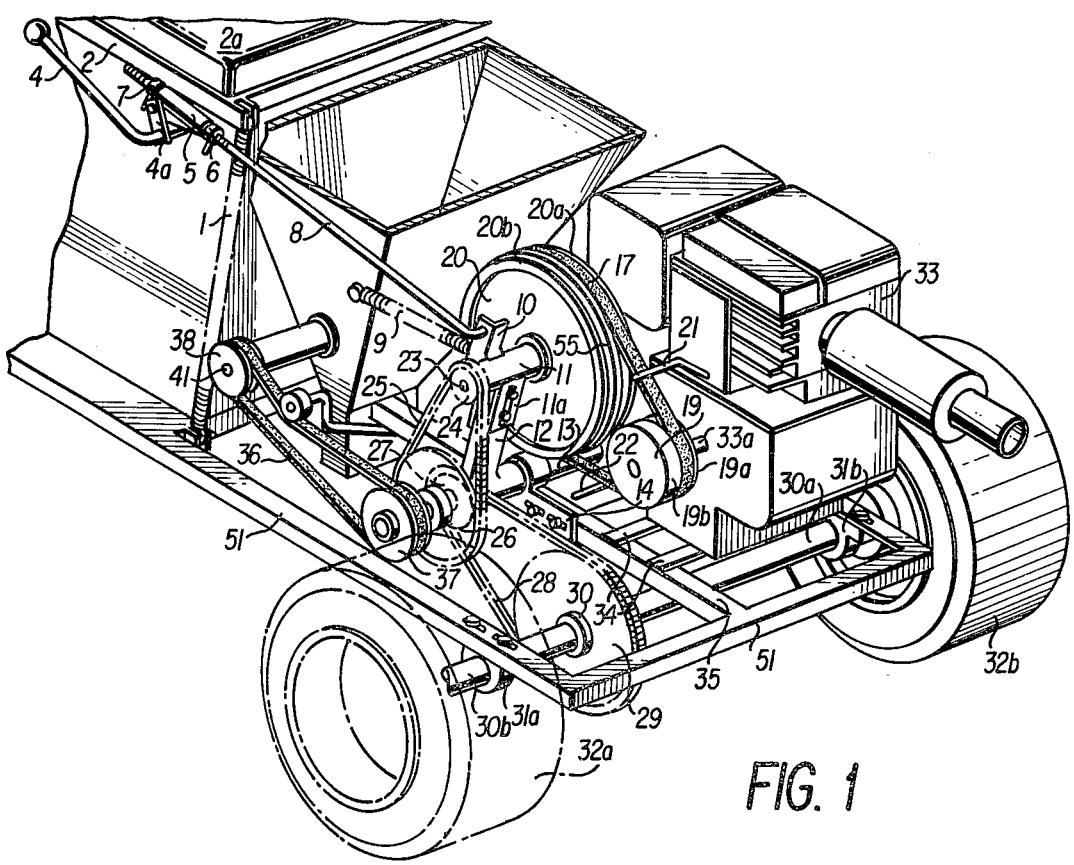
FIG. 1 is a perspective view of the power control apparatus of the present invention.
Figure 2:
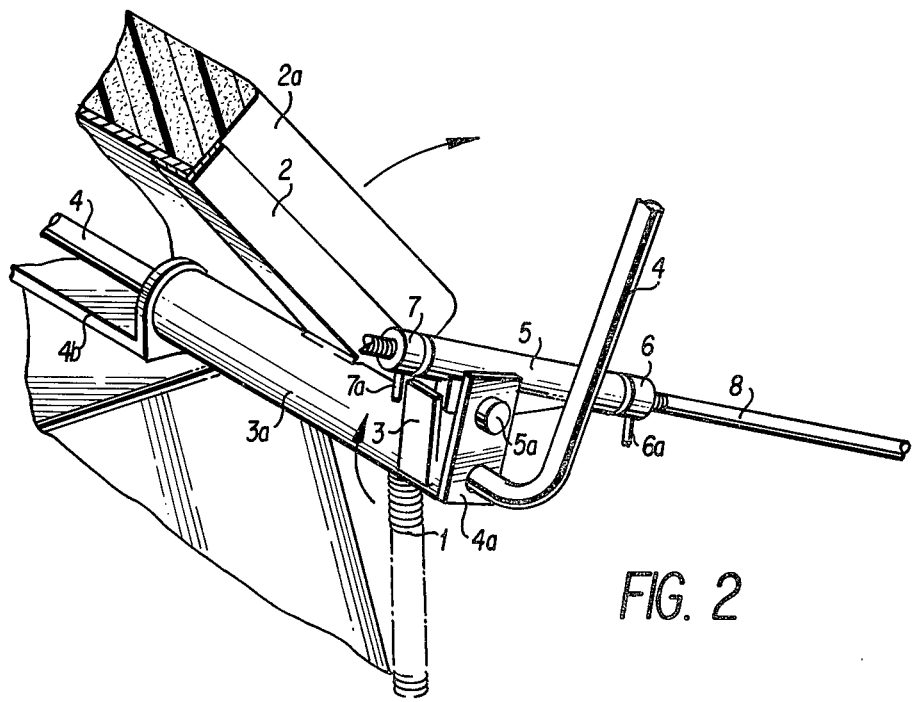
FIG. 2 is a perspective view of a portion of the apparatus illustrated in FIG. 1.
Figure 3:
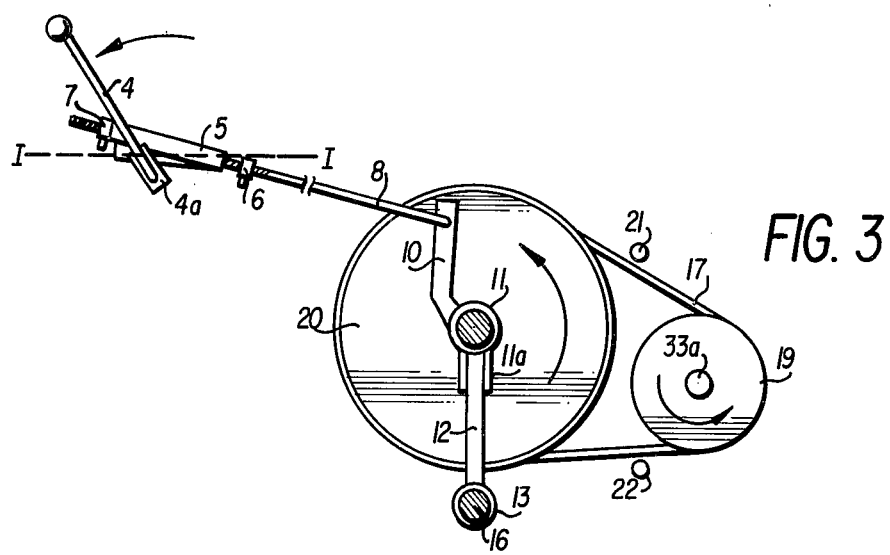
FIG. 3 is a side view of a portion of the apparatus illustrated in FIG. 1 when the power control apparatus is in its forward mode.
Figure 4:
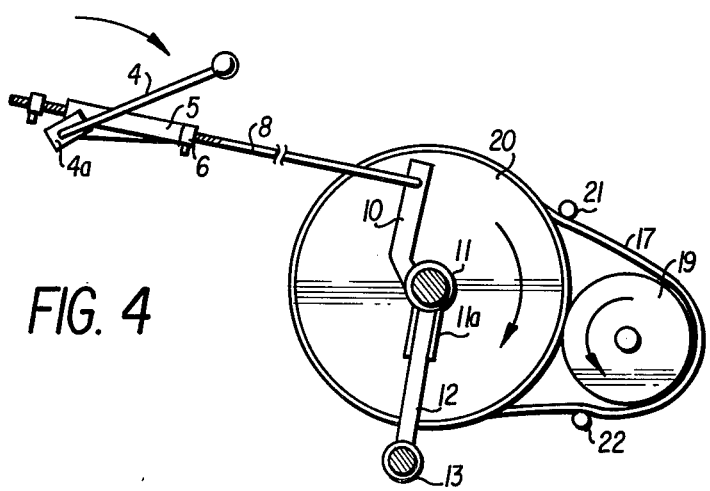
FIG. 4 is a side view of a portion of the apparatus illustrated in FIGS. 1 and 2 when the power control apparatus is in its reverse mode.
Figure 5:
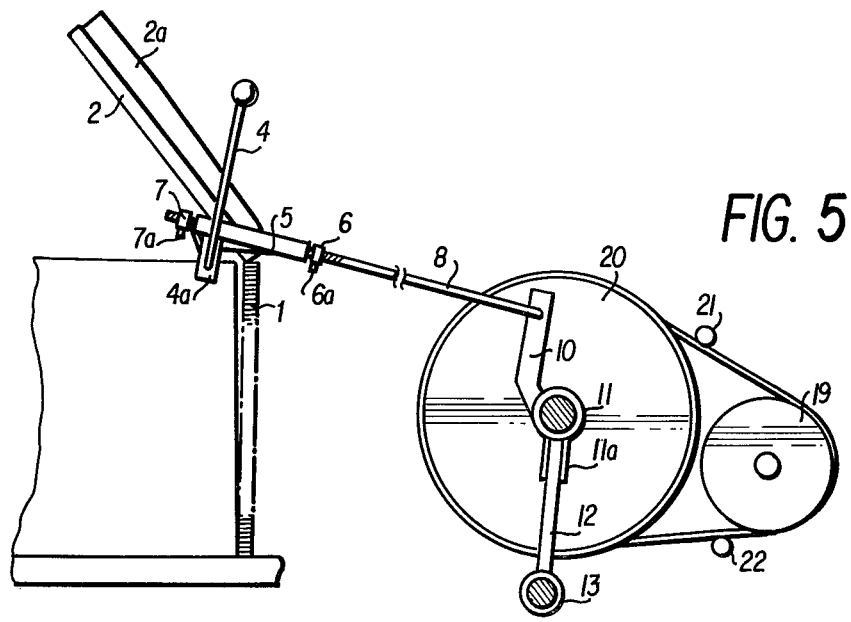
FIG. 5 is a side view of a portion of the apparatus illustrated in FIGS. 1 and 2 when the seat disengagement apparatus is in operation.

A spring 1 under tension holds a seat frame 2 and associated seat 2a in a normally raised position (FIGS. 2 and 5). The seat frame 2 is supported and pivoted on a support bracket 4b affixed to the vehicle. A control lever or handle 4, fixed to a lever 4a, extends through a torque tube 3a attached to the seat frame 2, through the support bracket 4b (only one two identical ends being shown in FIG. 2), and through another seat tube similar to tube 3a (not shown) also attached to seat frame 2 at a side opposite that shown in FIGS. 1 and 2. A striker 3 is secured to the torque tube 3a in a position such that when the seat frame 2 is in a raised position, the striker 3 by its clockwise rotation abuts and forces an adjustment tube 5 to move rearward which causes the power control apparatus to assume and hold a neutral position (FIG. 5) as described further below.

Adjustment tube 5 is pivotably coupled via pin 5a to lever 4a which rotates with rotation of control lever 4 and is slideable over one end of a push rod 8 which passes therethrough. The push rod 8 has its other end connected to a pivot bracket arm 10. Nuts 6 and 7, are respectively threaded on the push rod 8 on opposite sides of the adjustment tube 5 and function to adjust the reverse and forward drive engaging positions of the vehicle by defining how far lever 4 must move the slideable adjustment tube 5 before it in turn engages with a threaded nut to move push rod 8. These nuts permit an operator to make adjustments for wear. Both nuts 6 and 7 have respective projecting arms 6a and 7a attached thereto which, by the force of gravity, hang down to hold nuts 6 and 7 against any rotation by vehicle vibrations. Nuts 6 and 7 are preferably not tightened against tube 5 but are spaced a short distance therefrom and are positioned on rod 8 to be easily reached and adjustment by a seated operator.

A tension-compression spring 9 attaches the pivot bracket arm 10 to a rigid point on the vehicle forward of the engine biasing it to a predetermined neutral position as determined by the equilibrium point of spring 9. In the line marking apparatus of the aforesaid U.S. patent, the hopper is a convenient point for attaching this spring. The pivot bracket arm 10 is secured to a lower bearing support bracket 12 by bolts passing through slotted straps 11a. Straps 11a allow for an adjustment of the distance between an upper bearing assembly 11 attached to the straps 11a and a lower bearing assembly 13 at the end of bearing support bracket 12. The slotted straps 11a are provided to adjust the tension in chain 25 provided between sprockets 24 and 26.

The support bracket 12 is integrally connected to the lower bearing assembly 13 which is formed of a tube having bearings (not shown) pushed into each end thereof. A shaft 16 passes through the two bearings located in tube 13b and through another bearing (not shown) secured to the vehicle. The bearing assembly 13 is rotatable within a bearing bracket 14 upon movement of the pivot bracket arm 10 connected therewith. The bearing bracket 14 through which the lower bearing assembly 13 passes, is movable along a frame 35 to adjust the tension of belt 36. Belt 36 interconnects pulleys 37 and 38 such that rotation of shaft 16 fixed to pulley 37 causes rotation of pulley 38 and an associated shaft 41 connected to the hopper of the line marking machine. The function of the hopper shaft is fully described in the above-mentioned U.S. patent.

The upper bearing assembly 11 being mounted on support bracket 12 which is integral with lower bearing assembly 13 may rotate about the center axis of the shaft 16 without loosening or tightening chain 25.

The vehicle is propelled by a drive sprocket 29 which is connected via chain 28 with a drive sprocket 27 rotating with shaft 16. Sprocket 29 is connected to axles 30a and 30b through a differential 30. The axles 30a and 30b are rotatable within support bearings 31a and 31b and the wheels 32a, 32b are respectively attached to the ends of the axles 30a, 30b. Chain 28 has its tension adjusted by adjustments in the longitudinal position of the bearings 31a, 31b relative to the vehicle frame 51. Sprocket 27 is connected with shaft 16 which is in turn connected with sprocket 26 such that rotation of sprocket 24 communicated to sprocket 26 via chain 25 is coupled to sprocket 27 which in turn couples this rotative movement via chain 28 to sprocket 29 and then to the wheels.

The engine 33 is secured to the frame 51 of the vehicle by, for example, bolting it to mounting straps 34. A pulley 19 is attached to the engine output shaft 33a which rotates at a substantially constant high RPM. An additional pulley (not shown) is also attached to the engine output shaft 33a for driving the grass cutter (not shown) of the line marking vehicle.

The pulley 19 is constructed of two sections, a V-grooved section 19a adapted to contain a V-belt 17, and a flat circumferential section 19b of larger diameter than the V-grooved section 19a. Belt 17 attaches the V-grooved section 19a to a drive pulley 20 also constructed to have a V-grooved section 20a and a larger diameter flat circumferential section 20b. Grooved section 20a of the drive pulley is engaged with the belt 17. The flat section 20b of drive pulley 20 is covered with a rubberized belt 55 and lies in the same plane as the flat section 19b of pulley 19. The rubberized belt 55 may be formed of a conventional V-belt streached over the flat section 20b.

Drive pulley 20 is connected to shaft 23 rotating in the upper bearing assembly 11 which rotates sprocket 24 connected to rotate shaft 16 by sprocket 26 and chain 25. Rotation of shaft 16 is imparted to the drive wheels 32a, 32b by sprockets 27, 29 and chain 28 as described above. By virtue of being connected with the upper bearing assembly 11 which is connected with pivot control arms 10, the drive pulley 20 is enabled to move in a radial arc about the shaft 16 in accordance with the pivotal movement of pivot bracket arm 10 which in turn moves, via push rod 8 and tube 5, upon movement of control lever 4.

A pair of belt release bars 21 and 22 are secured to the engine and are disposed transversely to the belt at opposite outside sides thereof such that they do not interfere with the belt when it is tensioned by drive pulley 20 being moved away from pulley 19. However, the positioning of belt release bars 21 and 22 is such that when the drive pulley 20 is moved toward pulley 19 and the belt 17 becomes slack, they contact the outside of belt 17 forcing it to loosen from groove 19a of pulley 19. The belt release bars ensure that no rotative force is transmitted from pulley 19 to drive pulley 29 when the vehicle is placed in a neutral or a reverse condition.

Having described all of the structures utilized in the power control apparatus of the present invention, it is believed the further description thereof will be aided by describing its typical operation.

An an operator starts the engine, tension-compression spring 9 holds the bearing assembly 11, drive pulley 20, and through rod 8 and tube 5, the control lever 4 in a neutral position. If the control lever 4 were accidently moved from its neutral position without seat frame 2 being lowered, striker plate 3 would force tube 5 and control lever 4 back to the neutral position as shown in FIGS. 2 and 5. The operator lowers the seat 2a and associated seat frame 2 against the biasing provided by spring 1 and the torque tube 3a rotates moving striker 3 out of contact with the pivot 5a of lever 4a and adjustment tube 5. The operator thereafter grasps the handle 4 and moves it from its neutral position forward if a forward direction is desired. Upon moving handle 4 forward (FIG. 3), lever 4a and pivot 5a move the adjustment tube 5 forward into contact with adjustment nut 7. Following contact of the tube 5 with the adjustment nut 7, further movement of tube 5 causes rod 8 to move forward which results in the counterclockwise rotation (as viewed in all Figs.) of pivot bracket arm 10. With the counterclockwise rotation of the pivot bracket arm 10, the tension compression spring 9 is put into compression and the upper bearing assembly 11, shaft 23 and associated drive pulley 20 pivot around the axis of shaft 16 in a counterclockwise direction. The full movement of lever 4 to its forwardmost position pulls drive pulley 20 away from pulley 19 to fully tighten belt 17 and transmit full engine RPM from the engine drive shaft 33a and pulley 19 to the drive pulley 20.

As lever 4a pivots about the axis of lever 4 upon movement of the latter, it passes over an imaginary line between the pivot point of rod 8 and the axis of lever 4. The imaginary line I (FIG. 3) called dead-center establishes a position which, if pivot 5a is moved beyond by operation of lever 4, will allow the power control apparatus to remain in a locked position and not be effected by forces acting on the pivot bracket 10. This locking is further aided by the force of gravity which acts upon the handle 4 tending to rotate it in a counterclockwise manner thus pulling on rod 8 and the holding pivot bracket 10 in its counterclockwise rotated position. The striker 3, when the seat frame is down, is positioned just below the dead-center point I and functions to stop the downward travel of the pivot 5a. As a result of this arrangement, the lever 4 may be released and belt 17 will still remain taut.

As the operator begins to move lever 4 forward from its neutral position a short distance, a controlled slippage begins to occur between belt 17 and pulley 19 causing a slow rotation of the drive pulley 20 via the coupling of belt 17 with groove section 20a. As the lever 4 is moved still further forward from its neutral position, less slippage occurs, and a slightly increase rotation of pulley 20 occurs. If the lever 4 is held at a selected forward position, a steady reduced forward speed occurs. Thus, the speed of pulley 20 and consequently of the vehicle increases in proportion to the forward position of lever 4 which controls the distance between pulleys 19 and 20.

If an operator moves lever 4 backwards (clockwise in drawings) from its neutral position (FIG. 4), which is determined by the equilibrim point of pivot bracket 10 established by tension-compression spring 9, the adjustment tube 5 is caused to move backwards by its pivotal connection 5a with lever 4a unitl it contacts the adjustment nut 6. Further backwards movement causes the pushing of rod 8 to the rear. As rod 8 moves backward, it causes bracket arm 10 to rotate in a clockwise manner along with bearing assembly 11, shaft 23 and pulley 20. As a result of this clockwise rotation of pulley 20 about axis 16, the belt 17 slips about pulley section 20a and the V-belt 55 secured to the flat section 20b of pulley 20 eventually comes in contact with flat pulley section 19b of pulley 19 causing reverse rotation of pulley 20 and reverse movement of the vehicle. If when in reverse operation, handle 4 is thereafter released, the spring 9 contracts pulling with it pivot bracket arm 10, bearing assembly 11 and pulley 20. As a consequence, the V-shaped belt 55 is moved away from flat section 19b of pulley 19 to stop the reverse movement of the vehicle.

The function of belt control arms 21 and 22 will now be described. If the power control apparatus as described was in its neutral position, that is, bearing assembly 11 and pulley 20 were at their neutral point, and release rods 21 and 22 were not present, belt 17 being loose in groove 19a of pulley 19 would try to equalize into a position which would form a true round circle. This would cause friction contact between belt 17 and pulley 19 and the friction caused by pulley 19 rotating against belt 17 would cause it to cling to pulley 19 such that the bottom side of the belt would form almost a straight line from the pulley 20 to the pulley 19. Meanwhile, the top side of the belt 17 would form a big loop and the increased friction between belt 17 and pulley 19 caused thereby would enable the belt to transmit power to pulley 20 as if it were in a taut position. However, with release rods 21 and 22 in place, when the belt tries to form a circle; it contacts bars 21 and 22 as it tries to expand creating a back pressure on belt 17. This causes belt 17 to loop towards the rear of pulley 19 and move out of and away from the pulley groove 19a thus ensuring that no inadvertent coupling of motive power between the engine and drive sprocket 29 can occur.

Because of the presence of the release rods 21 and 22, as the control lever 4 is moved forward from its neutral position, the belt 17 starts a pull and release operation in rapid succession. The rapidity of the pull and release operation is such that it cannot be felt by an operator and the cooperation of belt 17 and pulley 19 acts like a ratchet drive. As handle 4 is moved further forward increasing belt tension 17, the contacting of rods 21 and 22 with belt 17 becomes less causing less back pressure and increasing the duration of the pull on belt 17. Finally, in a full forward position of the lever 4, the belt tension is such as to not contact rods 21 and 22 at all and continuous power is transmitted from the engine drive shaft 33a to the drive pulley 20.

Although the power control apparatus of the present invention has been described with reference to a particular embodiment and in a particular environment, i.e., a line marking machine, it should be appreciated that this discussion has been presented merely for the purposes of illustrating an examplary embodiment and is not to be limiting of the invention which is defined solely by the following claims.

What is claimed is:

1. A power control apparatus for an engine comprising:
    an engine having an output shaft;
    a first pulley connected with said output shaft,
    a second pulley,
    a pivotable control arm upon which said second pulley is mounted, said pivotable control arm being arranged such that its pivotal movement causes a change in the distance between the axes of said first and second pulleys,
    a first belt connected between said first and second pulleys for coupling rotative movement of said first pulley to said second pulley to thereby rotate said second pulley in a first direction, the tautness of said first belt being controlled by the position of said control arm, and
    means for controlling the RPM of said second pulley, said means for controlling being adapted to control the pivotal movement of said control arm to thereby vary the tautness of said first belt and therefore its slippage about said first pulley, said means for controlling comprising a tension-compression spring biasing said pivotable control arm to a neutral position where no rotation of said second pulley by said first belt occurs, a push rod connected to said pivotable control arm for moving the same, a control lever, and means for pivotably coupling said push rod with said control lever whereby movement of said control lever controls the movement of the pivotable control arm.

2. A power control apparatus as in claim 1 wherein said first and second pulleys each include a flat circumferential section, said flat circumferential section of said second pulley being covered with a friction surface, and wherein said means for controlling is adapted to move said control arm to pivot said second pulley such that its flat section engages with the flat section of said first pulley to thereby effect a rotation of said second pulley in a second direction opposite the first.

3. A power control apparatus as in claim 1 wherein said push rod is threaded at one end and said means for pivotably coupling comprises a tube pivotably coupled to said control lever through which said threaded end slidably passes, and a pair of adjustment nuts threadingly engaged with said threaded end of said push rod, one on each side of said tube, the adjustment of said nuts establishing the position where movement of said tube by said control lever begins to control movement of said push rod.

4. A power control apparatus as in claim 2 further comprising a pair of belt guides mounted traversely to and outside said first belt on opposite sides thereof, said belt guides being arranged to be out of contact with said first belt when said control arm is at a position where said second pulley is rotating in said first direction, and in contact with said first belt when said control arm is moved to a position where said first and second pulleys engage, said belt guides controlling the bending of said first belt to ensure its complete release from said first pulley.

5. A power control apparatus as in claim 2 wherein said second pulley is coupled to rotate a drive sprocket which drives a wheel of a vehicle upon which the engine is mounted.

6. A power control apparatus as in claim 3 wherein said nuts are each provided with a projection which depends in a downward direction under the force of gravity to thereby prevent rotation of said nuts by engine vibrations.

7. A power control apparatus as in claim 2 wherein each of said first and second pulleys has a V-grooved section and a said flat circumferential section adjacent thereto, said flat circumferential section of each pulley having a larger diameter than the adjacent V-grooved sections of each pulley.

8. A control apparatus as in claim 2 wherein said friction surface is constructed as a second belt streached over and secured to the flat circumferential section of said second pulley.

9. A control apparatus as in claim 1 wherein said engine output shaft rotates at a substantially constant RPM.

10. A power control apparatus as in claim 5 wherein the coupling of said second pulley to said drive sprocket comprises a first shaft rotating with said second pulley, a first sprocket mounted on said first shaft, a first chain connecting said first sprocket with a second sprocket, a second shaft secured to said second sprocket and a third sprocket and a second chain connecting said third sprocket with said drive sprocket.

11. A power control apparatus as in claim 10 further comprising means for adjusting the tension in said first and second chains.

12. A power control apparatus as in claim 1 further comprising means for adjusting a pivot point for said pivotable control arm.

13. A power control apparatus as in claim 6 wherein said vehicle includes an operator seat and said control lever and adjustment nuts are accessible from said operator seat.

14. A power control apparatus as in claim 3 wherein said second pulley is coupled to rotate a drive sprocket which drives a wheel of a vehicle upon which the engine is mounted.

15. A power control apparatus as in claim 14 wherein said vehicle includes an operator seat and said apparatus further comprises a safety device for forcing said pivotable control arm to a neutral operating position when said seat is unoccupied.

16. A power control apparatus as in claim 15 wherein said safety device comprises a pivotable seat frame which is biased by a biasing means to a raised position when said seat is unoccupied and lowered against the force of said biasing means when said seat is occupied, and a striker plate connected to said seat frame for rotative movement therewith, said striker plate being positioned to abut and urge said tube and said push rod to move said control arm to a neutral position when said seat frame is raised and to disengage from said tube when said seat frame is lowered.

17. A power control apparatus as in claim 3 wherein the pivotal coupling of said tube to said control lever establishes a dead-center position for said control lever, movement of said pivotable coupling point of said tube and control lever forward of said dead-center point causing a locking of said tube and thus said control lever in a selected position.

18. A control apparatus as in claim 16 wherein said striker, when said seat frame is lowered, is arranged to limit the forward movement to said control lever by engaging with said tube.

19. A power control apparatus for an engine comprising:
an engine having an output shaft,
a first pulley connected with said output shaft having a first V-grooved shaped outer peripheral section and a second circumferentially flat outer peripheral section, said second outer peripheral section having a larger diameter than said first outer peripheral section,
a second pulley having a third V-grooved shaped peripheral section and a fourth circumferential flat outer peripheral section, said fourth flat outer peripheral section being provided with a flat rubberized friction surface on its outer periphery and being larger in diameter than said third peripheral section,
a pivotable control arm upon which said second pulley is mounted for movement relative to said first pulley,
a tension-compression spring for biassing said control arm to a predetermined neutral position,
a control rod connected to said control arm for pivoting said control arm about a predetermined axis,
a control lever,
a tube coupled to axially move said rod, said tube being pivotably coupled to said control lever, such that movement of said control lever causes movement of said tube, axial displacement of said control rod, and pivotal movement of said support arm,
a sprocket assembly coupling said second pulley to an output sprocket,
a belt connecting the V-shaped portion of said first pulley with the V-shaped portion of said second pulley,
a pair of belt engaging arms for constraining said belt from looping outward of said first pulley when said second pulley is moved towards said first pulley a predetermined amount by rotation of said control arm, said control lever being operative such that upon forward movement thereof said control rod moves forward to pull said second pulley away from said first pulley to tighten said belt about said first and second pulleys, the slippage between said belt and said first and second pulleys being controlled by the amount of forward movement of said control lever, said control lever further being operative in a reverse position, to move said second pulley towards said first pulley to a position where said rubberized friction surface on said second pulley engages with the flat section of said first pulley to cause reverse rotation of said second pulley, said belt engaging arms touching said belt at a predetermined position of the movement of said second pulley towards said first pulley to constrain said belt from forming a loop thereby ensuring the complete slippage of said belt about said first pulley, and
a safety means connected with a seat of said vehicle and operative such that when said vehicle seat is unoccupied, said control arm is biased to a neutral position, said safety device comprising a seat frame biased to a raised position by a biasing means, a strike plate mounted for rotative movement with said seat frame, said strike plate, when said seat frame is in a raised position, being arranged to contact with said tube to force said rod and control arm connected therewith to a neutral position, said strike plate being rotatable upon said seat being placed in its operative position, to release said tube and allow its movement by said control lever.

* * * * *